United States Patent Office 3,639,571
Patented Feb. 1, 1972

3,639,571
COMPOSITION AND METHOD FOR RETARDING PLAQUE AND DENTAL CALCULUS
Samuel Turesky, 84 Wallis Road, Chestnut Hill, Mass. 02167, and Irving Glickman, 24 Manor House Road, Newton, Mass. 02159
No Drawing. Continuation-in-part of application Ser. No. 530,781, Mar. 1, 1966, which is a continuation-in-part of application Ser. No. 679,994, Nov. 2, 1967, which in turn is a continuation-in-part of application Ser. No. 763,491, Sept. 23, 1968. This application Jan. 29, 1970, Ser. No. 6,933
Int. Cl. A61k 7/16
U.S. Cl. 424—54
13 Claims

ABSTRACT OF THE DISCLOSURE

Formation of bacteria, e.g. of the type resulting in formation of bacteria, e.g. of the type resulting in the formation of dental plaque and dental calculus, is retarded by exposing surfaces to be protected to a composition containing compounds of the formula:

Where one of $R_1$, $R_2$ and $R_3$ is an amine group or substituted amine group and $R_2$ and $R_3$ are physiologically-tolerable organic radicals.

CROSS-REFERENCE TO RELATED APPLICATION

This application is a continuation-in-part of our application Ser. No. 530,781, filed on Mar. 1, 1966, our application Ser. No. 679,994, filed on Nov. 2, 1967, and application Ser. No. 763,491, filed on Sept. 23, 1968, all now abandoned.

BACKGROUND OF THE INVENTION

Field of the invention

This invention relates to a method and composition for avoiding bacterial growth on surfaces and especially for retarding formation of dental plaque and the dental calculus or tartar which evolves from the formulation of such plaque. More specifically, it relates to dentifrices containing as active ingredients certain organophosphorous surface-active agents which resist phosphatase-type enzymes.

The prior art

There has been a considerable amount of work devoted to the avoidance of bacterial growth on various surfaces. Many surfaces which must be maintained free of bacteria are found in chemical processing plants or like sensitive environments. However, among the more important problems has been the formation of bacteria on surfaces within the mouth.

The role of dental calculus in promoting gingival irritation and periodontoclasia is well known, though perhaps not completely understood. It is formed by hardening of plaque (a soft, adhesive, bacterial, concrescent, and primarily organic deposit on the teeth) through a calcification process which appears to involve the seeding of calcium phosphate crystals. Thus, the most effective method of inhibiting calculus formation has been to cleanse the teeth to remove therefrom the plaque from which the calculus is evolved. However, thorough cleansing requires the use of an abrasive, and an abrasive is contained in most dentifrices although it abrades the enamel to some extent. Even the plaque that forms on the teeth between cleanings provides a sufficient basis for harmful calculus formation and growth.

One of the problems encountered in inhibiting bacterial deposits is the provision of an anti-bacterial agent that will be effective in a neutral or mildly acidic environment. Thus, for example, the compositions disclosed by Buonocore et al. in U.S. Pat. 2,955,984 and incorporating compounds of the formula

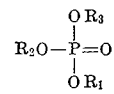

(wherein an $R_1$, $R_2$ and $R_3$ are variously alkyls, aralkyls, hydrogens, ammonium or alkali metal) are not fully satisfactory because they tend to have the greatest effect at lower pH levels than those experienced in the mouth, and other less acidic environments, over any long period of time.

Another problem encountered in inhibiting bacterial deposits is the provision of an anti-bacterial agent that will remain effective in environments wherein the agent may be subjected to attack by enzymes. The human mouth is also a good example of such an environment.

Accordingly, an object of the present invention is to provide dentifrice compositions which retard the formation of dental plaque and dental calculus.

A further object of the invention is to provide a dentifrice of the above type whose calculus inhibiting effect does not require the use of an abrasive.

Yet another object of the invention is to provide a method of retarding the formation of dental calculus without the use of an abrasive.

Another object of the invention is to provide useful compositions useful for treating surfaces to avoid bacterial deposits thereon even when there is a substantial enzyme concentration in the environment in which the surface is to be protected.

Other objects of the invention will in part be obvious and will in part appear hereinafter.

The invention accordingly comprises the method and the composition possessing the features, properties, and the relation of constituents which are exemplified in the following detailed disclosure, and the scope of the invention will be indicated in the claims.

SUMMARY OF THE INVENTION

Briefly, we have found that certain organophosphorous compounds, and oligomers of such compounds, retard plaque and calculus formation, specifically those characterized by the structure.

where one of $R_1$, $R_2$ and $R_3$ is an amine group or substituted amine group preferably containing between eight and sixteen carbon atoms. The other two of $R_1$, $R_2$ and $R_3$ are, for example, OH groups, alkali metal salt forms, alkyl groups, aralkyl groups, alkaryl groups, aryl groups—both substituted and non-substituted—alkoxy groups, amine groups, amido groups or other substituents that are physiologically tolerable for use in oral hygiene applications and which do not completely prohibit the compound from being dissolved or dispersed.

It should be obvious to those skilled in the art that the precise treating composition useful in inhibiting bacterial growth on a particular surface will depend in large part on whether the surface is to be exposed to aromatic, aliphatic, or an aqueous environment during the period protection is to be maintained. Thus a rather hydrophillic and oleophobic inhibitor will be used if bacterial growth is to be inhibited in an aliphatic or aromatic environment. On the other hand, a relatively hydrophobic and oleophillic compound will be used if the active inhibitor is to be applied to surfaces known to be subjected to aqueous washing action. Teeth are examples of such surfaces.

The precise choice of particular active compound may also depend, of course, on the particular kind of bacteria to be avoided and the vigor with which the surface is subjected to any washing action. Thus, those skilled in the art will understand that the basic requirements of the invention are only that an amount of the bactericidal agent be coated on the surfaces which amount is effective in the particular environment. It is, however, a particular advantage of the invention that the treating compositions comprise active anti-bacterial agents which are useful in neutral and only slightly acidic environments and that they are resistant to enzyme attack.

It should also be understood that the anti-bacterial agents should usually be applied either directly or in a liquid vehicle in which they are at least miscible but not entirely soluble. If applied from solution, it is usually necessary to remove the solvent from the surface by evaporation to achieve the desirable coating. Washing alone may not deposit enough active ingredient. When the active ingredients are applied from a vehicle in which they are only partly soluble, they tend to deposit out on the surface and a mere washing of the surface is sufficient to obtain a good retention of the inhibitor on the surface; therefore, washing is the preferred way to apply a mouthwash. However, when the active ingredients are present in an essentially insoluble form, they must be emulsified in a carrying liquid or utilized as coatings. In some applications, one may wish to resort to evaporation of any vehicle to leave a substantial amount of anti-bacterial agent on the surface to be protected or to a "painting" process whereby it is assured some of the material is coated on each portion of the surface to be treated.

When used in dentifrices, it appears that compounds have the requisite amino-phosphorous linkage to attach themselves to surfaces, and because of their bactericidal qualities, interfere with the formation of bacterial growth, e.g. growth of plaque on teeth surfaces. Also, these compounds, or portions of these compounds, appear to attach themselves to the seeding nuclei upon which crystals characteristic of dental calculus are ordinarily formed and thus interfere with crystallization and crystal growth. The compounds are surface-active and this probably explains why they completely wet surfaces and also why, in dentifrice applications they penetrate the plaque and previously-formed calculus to reach the sites of crystal formation and growth. They are also cationic and this characteristic apparently promotes a reaction with the crystal-nucleating substance. Moreover, they are substantive. That is, they adhere to surfaces and thus remain thereon for substantial periods after application to these surfaces. Finally the

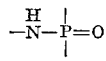

grouping not only contributes bactericidal action but also is resistant to enzyme attack and thereby makes the substantive quality of a compound meaningful in enzyme-bearing environments.

The calculus-inhibiting compounds are readily incorporated into dentifrices of various types. They are useful in such conventional forms as pastes, liquids and powders and in such less common forms as chewing gum, chewable pills and tablets. In any case, the amount and wearing properties of the abrasives ordinarily included in dentifrices to retard the build-up of plaque and calculus can be materially reduced when the calculus-inhibiting compounds described herein are used, thereby reducing the tooth-wearing propensities of the dentifrices. As used herein, the term "dentifrice" includes not only those substances used with toothbrushes or other mechanical tooth-cleaning equipment, but also mouthwashes, chewable pills and tablets as well as other less conventional forms of cleansers and mouth fresheners which may be used without such equipment.

Animal testing has indicated that the anti-bacterial and enzyme-resistant radical which is incorporated into the anti-bacterial surface-treating compositions of the invention is not toxic. For example the heart, spleen, esophagus, trachea, pancreas, thyroid, stomach duodenum, descending colon, urinary bladder, thymus, prostate, testis ovary and tube, adrenal, and brain of rats remained normal when they were given, orally, up to 5.0 grams per kilogram of monoethyl dodecylphosphoramidate. In general, no drug-related gross abnormalities or micropathology could be detected.

Moreover, closely supervised studies on human volunteers were carried out on dodecyl ammonium O-ethyl N-dodecyl phosphoramidate and other compounds, all indicating the physiological tolerability of these materials.

ILLUSTRATIVE EXAMPLES OF THE INVENTION

Characteristic of the compounds suitable for use in our invention are those described generally in U.S. Patent 2,406,423. These compounds contain alkyl amine groups and are markedly effective in inhibiting calculus formation. They are phosphoramidates and phosphonamidates which include lauryl ammonium N-lauryl ethoxy phosphoramidate:

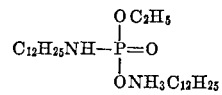

and its chloromethyl analog, lauryl ammonium N-lauryl chloromethyl phosphonamidate:

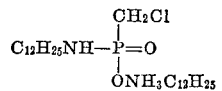

On the other hand, N,N dilauryl chloromethyl phosphonic diamide:

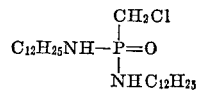

is insoluble in water and therefore is essentially ineffective by itself as a calculus inhibitor in a pure water medium. Also, the octodecyl homolg of the lauryl phosphoramidate is ineffective in a pure water medium. The reason for this is not clearly understood since the material seems to form a dispersion. It is likely, however, that it lacks adequate solubility to be effective. On the other hand, the long alkyl chain in this homolog may prevent a linkup with the seeding nuclei for steric reasons. Larger molecules, when present in a water medium, may be unable effectively to penetrate the plaque and previously formed calculus to reach the seeding sites. This steric factor should be kept in mind when synthesizing dentifrices.

However, a sodium salt of the phosphonamidate, e.g.

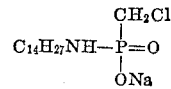

has been tried and proved effective in inhibiting crystal formulation in in vitro studies we have carried out. Since this sodium salt analog of the myristyl homolog is soluble, it further confirms the need for some solubility or dispersability of the compound. Compounds that are too water-soluble, however, tend to suffer from the disadvantage that they are more readily washed off tooth surfaces and therefore lose their effectiveness sooner than the slightly soluble types. It will be obvious to those skilled in the art that the particular degree of solubility required will depend in large part on the particular form of the dentifrice into which it is incorporated.

Another substance which has been particularly effective in retarding calculus formation is a material marketed by Victor Division of the Stauffer Chemical Company under the trade name "Victamine C". Victamine C is a class of compounds represented by the formula.

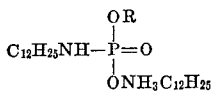

where R is an alkyl group. Another mixture that is also effective is the so-called chloromethyl analog of Victamine C which consists essentially of 50% lauryl ammonium N-lauryl chloromethyl phosphonamidate, 25% N,N' dilauryl chloromethyl phosphonic diamide, and 25% N,N' dilauryl ammonium chloromethyl phosphonate (diamine salt).

These compounds may in themselves have a somewhat unpleasant taste. However, as is common with various medicinal formulations, other ingredients can be used to mask the taste. For example, a liquid dentifrice providing the characteristics of the invention and useful as a mouthwash or in saturating a toothbrush may incorporate the following conventional formulation:

EXAMPLE 1

Boric acid—25 grams.
Thymol—0.5 gram.
Chlorothymol—0.5 gram.
Menthol—0.5 gram.
Eucalyptol—0.1 ml.
Methyl salicylate—0.2 ml.
Thyme oil—0.01 ml.
Ethyl alcohol—300 cc.
$H_2O$ to make 1,000 cc.

The dentifrice also contains one gram lauryl ammonium N-lauryl chloromethyl phosphonamidate per 100 cc. of the foregoing mixture.

The following four examples illustrate the effectiveness of our invention.

EXAMPLE 2

0.15% chloromethyl Victamine C was dispersed in 100 cc. of water. 0.2% peppermint oil was added to mask the taste of the chloromethyl Victamine C.

EXAMPLE 3

Same as Example 2 except 0.2% of lemon oil was used instead of peppermint oil.

EXAMPLE 4

Same as Example 2 except 0.2% of wintergreen oil was used instead of peppermint oil.

EXAMPLE 5

Same as Example 2 except 0.15% lime oil was used instead of peppermint oil.

Each of the above four formulations was tried on four human subjects who washed their mouths for thirty seconds four times daily with the material for three days. None brushed his teeth at all during the test.

Control group 1 consisted of the same four test subjects who several months prior to the test, after having their teeth thoroughly cleaned, did not brush their teeth and used no dentifrice whatsoever for three days. The amount of plaque formed on their teeth during the three day period was measured.

Control group 2 consisted of three of the same four subjects who had their teeth similarly cleaned and for three days washed their mouths four times each day with a bitter tasting solution of quinine sulfate in a manner similar to that use with the test formulations above. The constituency of the solution was unknown to the members of this group.

The fourth subject, control 3, whose teeth were also first well cleaned was made to wash his mouth for three days with distilled water in a manner similar to that used with the test formulations above.

Indices of plaque formation on the teeth based upon observational measurements showed a range 3.36 to 2.44 for the various control groups, while the range was 1.66 to 0.32 for the test group. The reductions ranged from 1.70 (a 50% reduction) to 3.11 (a 92% reduction).

The index used for the testing is based upon examination of the labial and lingual surfaces of all the teeth, upper and lower, except for the wisdom teeth. Thus there are fifty-six surfaces examined, viz twenty-eight teeth with inside and outside surfaces. To determine the presence of plaque, the teeth are stained with a fuchsin dye which causes plaque to appear as a granular deposit. The tooth area covered by plaque is then measured, i.e. the percentage of tooth covered by plaque from the gingival margin to the incisive edge of the tooth surface. The index is based upon an arbitrary range of zero, for complete absence of plaque, to five, for complete coverage with plaque. An index rating of one, for example, consists of small flecks of plaque at the cervical margin of the tooth. An index rating of two consists of a thin, continuous band of plaque at the cervical margin, while a rating of three consists of a band of plaque wider than the amount present with an index of two but not covering as much as a third of the tooth surface. A rating of four consists of more than one-third but less than two-thirds coverage of the tooth surface with plaque and a rating of five applies to coverage of more than two-thirds of the tooth surface with plaque. To assign an index rating to the amount of plaque present in any mouth, each of the fifty-six surfaces is assigned an individual plaque score based on a scale ranging from 0 to 5 in order of increasing plaque formation. An average of the fifty-six scores is then taken as the index rating for a particular subject.

In addition to illustrating the effectiveness of the material of our invention, these samples and tests indicate that our material does not lose its effectiveness in the presence of the more common flavoring agents.

Further confirmation of the value of the compounds of our invention in reducing plaque and calculus is reported in an article by Turesky et al entitled "Calculus Inhibition by Topical Application of the Chloromethyl Analog of Victamine C," Journal of Periodontology, volume 38, 1967, pages 142–147.

Aqueous dispersions of the organophosphorous compounds used in the invention may be substantially more acidic than the dental environment in the human mouth. In that case, a suitable base, e.g. 0.5 normal sodium hydroxide, may be added to attain the desired pH value, i.e. in the range of 5.5 to 7.5.

In this connection, it is well to note that certain compounds which effectively retard calculus formation will do so only in an environment which is substantially more acidic than the environment normally found in the human mouth. They are thus relatively ineffective unless the dental environment is made unduly acidic; thus they are essentially non-operative in dental applications. Sodium N-lauroyl sarcoside, disclosed in U.S. Pat. 2,689,170 is an example of a compound having this characteristic. Other compounds, such as the organic phosphates disclosed in U.S. Pat. 2,955,984 to Buonocore and Kuna, are relatively susceptible to hydrolysis when subjected to environmental factors common to the use of a dentifrice and, in particular, to enzymes present in saliva.

A qualitative correlation between laboratory tests of compounds and their effectiveness in human mouth has been obtained by using the simple procedure described by Turesky et al. in "Crystal Seeding by Salivary Calculus and its Inhibition In Vitro," Archives of Oral Biology, volume 10, 1965, pages 255–260. This technique may be further refined by the introduction of human saliva as set forth by Turesky et al in "Further Studies of Inhibition of Crystal Seeding in Calculus," The Journal of Periodontology, volume 36, 1965, pages 501–506.

The following examples illustrate the excellent correlation between in vitro results and results obtained from in vivo testing:

EXAMPLE 6

Six human subjects washed their mouths four times daily with 0.10% solution of chloromethyl Victamine C dispersed in 100 cc. of water. Reductions in plaque formation on the teeth of these subjects ranged from 21% to 58% with an average reduction of 43%.

EXAMPLE 7

Six subjects under conditions identical with those used to test the chloromethyl analog of Victamine C in Example 5 above washed their mouths four times daily with a 0.10% solution of Victawet 35 B. Here, no meaningful reduction of plaque was observed.

The in vivo test results of Examples 5 and 6, therefore, confirm the in vitro test results reported at page 502 in the article appearing in the Journal of Periodontology, volume 36, 1965, referred to above and establish the correlation between the in vivo and in vitro test results as indicated above.

The following table rates twelve compounds as either "effective," "ineffective" or "effectiveness unknown" as a result of in vitro testing conducted in accordance with the techniques described in the Turesky et al. article, supra. The dispersions used in the tests were prepared using an eight-speed "Osterizer" blender at a "Mix" setting. In each of these tests, water was used as a diluent. (The term "diluent" includes a solvent medium in the form of a liquid, such as water, but also includes any liquid into which the active ingredient is dispersed or, if the dentifrice is in the form of a paste or solid, includes within its meaning any extenders or fillers which may be in paste, powder or solid form.) In interpreting the effectiveness of the dentifrices listed below, one should realize that the judgment is being made for a specific system and, were the diluent varied, the results would probably differ from those set forth below.

| | | |
|---|---|---|
| A | 1.5% laurylammonium dihydrogen phosphate dispersed with 0.5% Tween 20 (polyoxyethylene sorbitan monolaurate) and adjusted to pH 7.0 with 0.4% NaOH (30%). | − |
| B | 1% laurylamine (distilled Armeen 12D) plus 0.75% sodium dihydrogen phosphate ($NaH_2PO_4 = H_2O$) dispersed with 0.5% Tween 20 and adjusted to pH 7.0 with 0.6% phosphoric acid (10%). | − |
| C | 1% laurylamine dispersed with 0.5% Tween 20 and adjusted to pH 7.0 with 0.9% concentrated hydrochloric acid (37%). | − |
| D | 1.5% "pure" ⓥictamine C at pH 7.0 | + |
| E | 1.5% 4x recrystallized ⓥictamine C at pH 7.0 | + |
| F | 1.5% acid of ⓥictamine C adjusted to pH 7.0 with 0.7% N/a NaOH solution. | + |
| G | 0.5% Tween 20 adjusted to pH 7.0 with N/2 NaOH | − |
| H | 1.5% monolaurylammonium salt of ethyl phosphoric acid dispersed with 0.5% Tween 20 and adjusted to pH 7.0 with 0.43% NaOH (30%). | − |
| I | 1.5% myristylammonium N-myristyl, O-ethyl phosphor amidate adjusted to pH 7.0 with 0.067% NaOH (2%). | + |
| J | 1.5% cetylammonium N-cetyl O-ethyl phosphor amidate adjusted to pH 7.0 with 0.13% NaOH (2%). | − |
| K | 1.5% laurylammonium N-lauryl, O-butyl phosphor amidate adjusted to pH 7 with 0.033% HCl (1.8%). | + |
| L | 1.5% octylammonium O-ethyl, N-octyl phosphor amidate adjusted to pH 7.0 with 0.5% $H_3PO_4$ (10%). | ? |

NOTE:
+ = Crystal growth was inhibited.
− = Crystal growth was not inhibited.
? = Results were inconclusive, since the plaque washed off the slide during the test.

Referring now once again to the basic structure $$R_1 - \overset{R_3}{\underset{R_2}{P}} = O$$

if $R_1$ is a laurylammonium group and $R_2$ is a laurylamide group, it makes little difference whether $R_3$ is an ethoxy group, a butoxy group, a chloromethyl group, etc. Also, the above tests indicate that where $R_1$ is a myristyl ammonium group, the compound is effective. However, where the $R_1$ chain is in the range of 16 to 18 carbon atoms in length or greater, it is ineffective when used with water as a diluent. It can, however, be effective in some other diluent, such as an alcohol. On the other hand, where the $R_1$ chain length is 8 carbon atoms or less, the compound lacks substantiveness, that is, it is so soluble that it washes off the slide and, consequently, it is not likely to adhere to constantly-wetted surfaces like teeth surfaces. Under these conditions, its use is impractical, even if it does inhibit crystal seeding while it is present. This does not mean however that such materials cannot be deposited on many other surfaces to combat the growth of bacteria in other than an aqueous medium.

EXAMPLES 7 THROUGH 12

The following are additional useful bacteria-inhibiting compositions when incorporated, according to the known principles of solvent selection, into a vehicle and applied therein to a surface on which it is desired to avoid the growth of bacteria.

Glass is utilized as a suitable test surface.

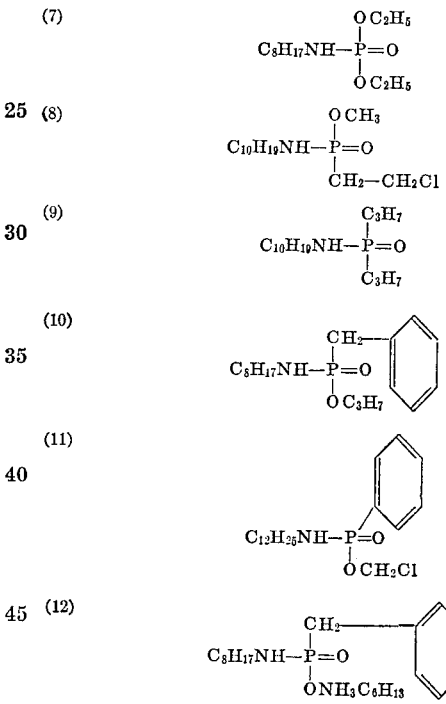

EXAMPLE 13

One particular promising compound is the monoethyl ester of dodecylphosphoramidate:

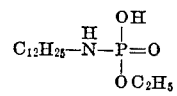

The compound was prepared by the following procedure:

A quantity of 92.5 grams of dodecylamine (obtained from Eastman Organic Chemicals Division of Eastman Kodak Co. under the trade designation Eastman P7750) and 50.5 grams of distilled triethylamine were in 500 milliliters of anhydrous ethyl ether. This solution was added slowly with stirring, over a period of about 30 minutes, to a second solution of 76.5 grams of phosphorus oxychloride in 500 ml. of dry ethyl ether and heat was removed from the reaction vessel to maintain the temperature at 25° C.

After the addition was completed, stirring was continued for another 90 minutes while maintaining the temperature below 25° C. A solution of 23 grams of absolute ethanol and 69.3 ml. of triethylamine in 500 milliliters of dry ethyl ether was then added over a 30-minute period, and the mixture was once again stirred for 90 minutes below 25° C.

Next a solution containing 9 milliliters of water and 69.3 milliliters of triethylamine carried in 100 milliliters of dry tetrahydrofuran was added to the phosphorous oxychloride-triethylamine reaction product, and the resulting mixture was stirred at room temperature overnight. Triethylammonium chloride precipitated and was filtered off.

The filtrate and washings were evaporated at reduced pressure to yield 132 grams (a 90% yield) of a honey-colored viscous syrup.

The resultant product was identified as 95% assay monoethyl ester of dodecylphosphoramidate. The atomic analysis: C, 57.32; H, 10.98; N, 4.77; P, 11.45. Among tests, other than the aforesaid elemental analysis, that were used in estimating purity and establishing identity were the infrared spectrum, nuclear magnetic resonance spectrum, and titration with perchloric acid in acetic acid. This latter test is indicative of high quality phosphoramidate.

procedures (i.e. no toothbrushing, etc.) except the mouthwash being tested. The mouthwash was used, by each subject, three times daily. About 25 millimeters of the wash was retained in the mouth for about one minute during each use.

The teeth of each test subject were scored to obtain plaque yield for labial and lingual surfaces of the teeth. The index set forth below, for each subject was obtained by dividing the total plaque score for each subject by the total number of his surfaces which were monitored during the test.

After 28 days of the test, the dry weight of the deposit during the 28-day experimental period was determined by collecting all deposits on all surfaces of the lower six anterior teeth (i.e. cuspid-to-cuspid inclusive). These deposits were dried at 212° F. for 2 hours in a pre-weighed pan. Comparisons were made of a control oral rinse (i.e. the formulation set forth above, but leaving out the dentifrice of the invention).

The results are set forth in Table I, below:

TABLE I

| Test subject | Plaque score | | | | | | | | Total deposit, dry weight after 28 days (in milligrams) | |
| | 3 days | | 10 days | | 21 days | | 28 days | | | |
| | Control | Ex. 13 | Control | Ex. 13 | Control | Ex. 13 | Control | Ex. 13 | Control | Ex. 13 |
| 1 | 2.78 | 0.78 | 3.67 | 1.07 | 3.65 | 1.80 | 3.90 | 2.15 | 25.1 | 6.6 |
| 2 | 2.32 | 0.27 | 2.94 | 1.54 | 3.52 | 1.34 | 3.73 | 1.75 | 2.4 | 0.7 |
| 3 | 3.01 | 0.11 | 3.63 | 0.32 | 3.50 | 0.61 | 3.71 | 1.27 | 10.6 | 1.7 |

Further analytical work suggest that substantial quantities of dimers, e.g.

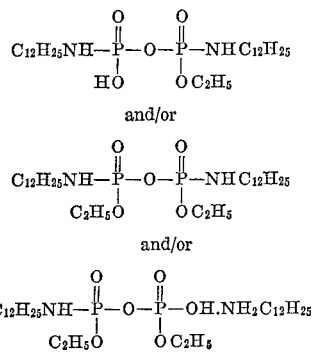

were present in the reaction product. Such materials, when present in less than major quantities, would be expected to be largely soluble in the primary reaction product, to have good bactericidal properties, and enhance adherence of compositions prepared from the product to teeth and other surfaces.

The material, the preparation of which is described above, was tested by incorporation into a mouthwash having the following formulae.

Ingredient: Weight percent
Polyoxyethylene stearyl ether _____ 0.325
Polyethylene glycol 400—monostearate ____ 0.325
Flavoring _____ 0.080
Ethyl alcohol, U.S.P. (190 proof) _____ 15.000
Glycerine _____ 5.000
Blue dye, 1% aqueous solution of _____ 0.052
0.02% aqueous saccharin solution _____ 79.218
Material, the preparation of which is described above _____ 1.00

101.000

This mouthwash was tested for its efficacy in inhibiting the formation of plaque and calculus. Each test participant had his teeth cleaned of all deposits and stains just prior to his participation in the test. During the ensuing 28-day test period, all subjects used no other oral hygiene

EXAMPLE 14

A trypticase mixture was prepared according to the following formulae:

Distilled $H_2O$—500 cc.
Trypticase—3 grams
Yeast extract—3 grams
$K_2HPO_4$—3 grams
$Na_2CO_3$—0.3 gram
0.1 Molar $MgSO_4 \cdot 7H_2O$—5 cc.
0.1 Molar $MnSO_4$—1 cc.

Samples containing 9 cc. of the resultant broth and one cc. of a 50% solution of sucrose in water were combined for use as a bacteria-growth-promoting vehicle in which to dip surfaces to determine their affinity for bacterial growth.

The following antibacterial test solutions were coated on glass substrates in order to demonstrate their usefulness in preventing the surface from fouling by bacterial growth thereon:

(1) Zephiran Chloride, i.e. the cationic detergent and antiseptic, benzalkonium chloride. (1% solution in sterile water)

(2) Cetyl pyridinium chloride. (1% solution in sterile water)

(3)

incorporated (1% by weight) into the oral rinse described above in Example 13.

In carrying out this test, glass cover slips were first sterilized by a soaking in 70% ethyl alcohol followed by a flame treatment. Sterilized cover slips were then treated by soaking in the test solutions for 5, 10 or 15 minutes and then rinsed with 200 cc. of sterile distilled water for five minutes. After this rinsing step, each cover slip was placed in a test tube containing 10 milliliters of the trypticase broth containing Streptococcus mutans #6715. This is a pure strain of bacteria isolated from caries in a human mouth. It is known to be a plaque-former and was obtained from the National Institutes of Health.

The cover slips were incubated at 37° C. for 18 hours in the bacteria-bearing broth. A sterilized, but untreated, cover slip control was also incubated in the bacteria-bearing broth.

When only a five-minute treatment in the test solutions was used, the zephiran chloride-treated cover slips and the cetyl pyridinium chloride-treated cover slips showed very considerable growth of bacteria, but the monoethyl ester of N-dodecyl phosphoramidate treated cover slip had very little bacterial growth.

With longer treatments, no bacteria showed upon the cover slip treated with the monoethyl ester of N-dodecyl phosphoramidate but copious growth showed up on all other cover slips.

EXAMPLE 15

The test procedure disclosed in Example 14 was repeated except (1) that 1% monochloromethyl dodecylammonium N-dodecyl phosphonamidate was used instead of the 1% of the monoethyl ester of dodecyl phosphoramidate and (2) that, the cover slips were treated with test solution for 1 minute and then air dried for 1 minute before being washed in distilled water for five minutes.

After a 48-hour incubation period, the cover slips treated with monochloromethyl dodecylammonium N-dodecyl phosphonamidate was clear of bacteria, but copious bacterial growth was found on the cover slips which had been treated with each of zephiran chloride and cetyl pyridinium chloride as well as on the pre-sterilized control over slips.

The monochloromethyl dodecylammonium N-dodecyl phosphoramidate was also demonstrated to be effective for inhibiting growth of plaque by testing on human subjects.

EXAMPLE 16

A chewable tablet, weighing 500 milligrams and prepared by conventional techniques, was prepared from the following formula:

| Ingredients: | Milligrams |
|---|---|
| Chloromethyl Victamine C | 15.0 |
| Sorbitol | 479.0 |
| Aromalok Peppermint #2599 | 3.0 |
| Aromalok Methyl Salicylate #26455 | 3.0 |
| Soluble saccharin | 5.0 |

Five people used these tablets in an oral hygiene program for a period of several days. Tablets were chewed four times daily and swished about in the mouth for one minute before the residue was spit out.

Average plaque formation was reduced to 36% of its former growth rate on that subject who was the least beneficially affected. Formation was reduced to less than 3.5% of the former growth rate on the subject most beneficially affected. Average plaque formation on the test subjects was only 18.7% of what it was measured to be during an equivalent time period which the tablets were not used.

Since the sodium salt form of the phosphoramidate has been found effective in in vitro studies, the character of $R_2$ is not deemed to be highly critical. It obviously may be any of a variety of substituents such as an amide group, a hydroxyl group, an alkoxy group ( to provide a phosphoramidate, an alkali metal salt form, an alkylaryl group, an aryl group or an aralkyl group.

It is to be noted that the compounds of our invention are effective at a pH of 3 to 10, but are preferably used at a pH of 5 to 7.5. They are also effective to reduce plaque and calculus at concentrations of 0.01 to 5.0 percent. They are virtually 100 percent effective at concentrations of 1.50 percent above. The optimum concentration is generally within a range 0.10 percent to 1.5 percent due to the possibility of mouth tissue irritation at high concentrations.

In summary, we have described a novel dentifrice incorporating as an active ingredient one or more of the organophosphorous compounds described above, these compounds being characterized by surface activity, cationic activity, bactericidal activity, solubility, and substantiveness, together with the ability to react in the manner described in a substantially neutral environment in the presence of saliva. We have also described a novel method for inhibiting plaque and calculus formation, the method consisting of exposing the calculus-forming areas in the mouth to these organophosphorous compounds, especially compounds characterized by an amine group-to-phosphorous linkage

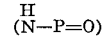

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A dentrifice composition comprising (A) a diluent and (B) at least 0.01% by weight of an active ingredient selected from
   (1) compounds of the formula

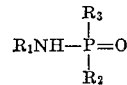

wherein at least one of $R_2$ and $R_3$ is hydroxyl, chloroalkyl, an ammonium or metallic salt form of said hydroxy group;
   wherein the other of $R_3$ and $R_2$ is hydroxy, chloroalkyl, an ammonium or metallic salt form, alkoxy, alkyl, aryl, aralkyl, alkaryl or an amine or amido group;
   wherein $R_1$ is an alkyl group, an aryl, an alkaryl or an aralkyl group and
   wherein any of $R_1$, $R_2$, and $R_3$ contain up to about 18 carbon atoms and all aryl-containing radicals contain only single-ring radicals
   (2) an oligomer of said compounds or
   (3) a mixture of said ingredient and at least one said oligomer.

2. The dentifrice defined in claim 1 in which said compound is

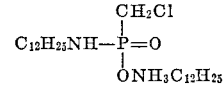

3. The dentifrice defined in claim 1 in which said compound is

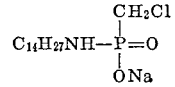

4. The dentifrice defined in claim 1 in which at least two of $R_1$, $R_2$ and $R_3$ are amine groups or substituted amine groups.

5. The dentifrice defined in claim 1 in which at least one of $R_1$, $R_2$ and $R_3$ is an alkyl amine group and one other of $R_1$, $R_2$ and $R_3$ is an ammonium or metallic salt form.

6. A method of retarding formation of dental calculus, said method comprising exposure of the sites of plaque and calculus formation and growth to composition comprising at least 0.01% of an at least slightly soluble cationic compound selected from
   (1) compounds of the formula

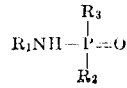

wherein at least one of $R_2$ and $R_3$ is hydroxyl, chloroalkyl, an ammonium or metallic salt form of said hydroxy group, wherein the other of $R_3$ and $R_2$ is hydroxy, chloralkyl, an ammonium or metallic salt form, alkoxy, alkyl, aryl, aralkyl, alkaryl or an amine or amido group;

wherein $R_1$ is an alkyl group, an aryl, an alkaryl or an aralkyl group and wherein any of $R_1$, $R_2$, and $R_3$ contain up to about 18 carbon atoms and all aryl-containing radicals contain only single aromatic-ring radicals;

(2) an oligomer of said compounds, or (3) a mixture of said ingredient and at least one said oligomer.

7. The method defined in claim 6 in which said compound is

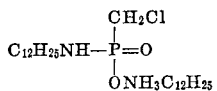

8. The method defined in claim 6 in which said compound is

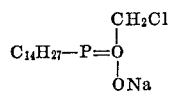

9. A dentifrice composition comprising (A) diluent and (B) as an active ingredient at least about 0.01% by weight of (1) a compound having the formula

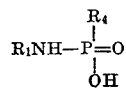

wherein $R_1$ is an alkyl group having up to 18 carbon atoms and $R_4$ is a hydroxyl, alkyl, alkoxy, amine or amido group, alkaryl, aralkyl, or aryl group, or (2) an oligomer of said compound, or (3) a mixture of said compound and at least one said oligomer, and wherein alkyl containing groups have up to 18 carbon atoms, wherein aryl-containing radicals comprise only single-ring aryl groups.

10. The dentifrice defined in claim 9 wherein $R_4$ is an alkoxy group.

11. The dentifrice defined in claim 9 wherein $R_4$ is a chloromethyl group.

12. A dentifrice comprising a diluent and an active ingredient having the formula

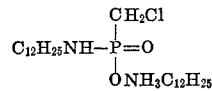

said active ingredient being present in an amount of 0.01 to 5.0 percent by weight.

13. The dentifrice defined in claim 12 in which said active ingredient is present in an amount of 0.1 to 1.0 percent by weght.

References Cited

UNITED STATES PATENTS

| | | | |
|---|---|---|---|
| 2,406,423 | 8/1946 | Woodstock | 260—161 |
| 2,689,170 | 9/1954 | King | 424—54 |
| 2,955,984 | 10/1960 | Buonocore et al. | 424—57 |

FOREIGN PATENTS

| | | | |
|---|---|---|---|
| 603,921 | 8/1960 | Canada | 424—211 |

RICHARD L. HUFF, Primary Examiner